May 12, 1931.  F. H. MEYER  1,804,635
VEHICLE WHEEL STRUCTURE
Filed Jan. 12, 1927

Inventor.
Frank H. Meyer
Evans & McCoy
Attorneys.

Patented May 12, 1931

1,804,635

UNITED STATES PATENT OFFICE

FRANK H. MEYER, OF WARREN, OHIO, ASSIGNOR, BY MESNE ASSIGNMENTS, TO THE GOODYEAR TIRE & RUBBER COMPANY, OF AKRON, OHIO, A CORPORATION OF OHIO

VEHICLE WHEEL STRUCTURE

Application filed January 12, 1927. Serial No. 160,545.

This invention relates to vehicle wheel structures and particularly to an improved felloe for securing tire carrying rims on vehicle wheels.

One of the objects of the invention is to provide an improved felloe of simple and inexpensive design that is adapted to rigidly secure a tire carrying rim on a vehicle wheel.

A further object of the invention is to provide a felloe embodying a series of circumferentially spaced clamping bolts each having their head portions disposed within the felloe and provided with tapered or wedge-shaped rim seating faces.

A further object of the invention is to provide a felloe having a tapered, slightly yielding rim supporting face and laterally shiftable tapered supporting faces adapted to contact with a single correspondingly tapered seating face formed on a vehicle rim.

An additional object of the invention is to provide a rim seating felloe having an annular, substantially continuous tapered rim seating face and a series of spaced clamping bolts each having a head that is provided with a rim seating and wedging face substantially forming a continuation of said annular seating face.

A further object of the invention is to provide a rim supporting felloe that shall have a single rim securing and clamping face and shall also embody a deflection limiting shoulder laterally spaced from said securing face and adapted to prevent undesirable deflection of the overhanging unsupported portion of the vehicle rim without providing an additional rim clamping seat.

An additional object of the invention is to provide an improved felloe for securing a vehicle rim embodying an endless and a transplit member of the type shown in Klaus Patent No. 1,590,762 on a wheel structure, the felloe being so arranged that a clamping face is provided underlying the endless locking ring portion of the rim, and a second spaced deflection limiting shoulder is provided intermediate the unsupported portion of the transplit rim member, the deflection limiting shoulder being adapted to exert no expansive outward radial clamping force on the transplit rim member.

Figure 1:
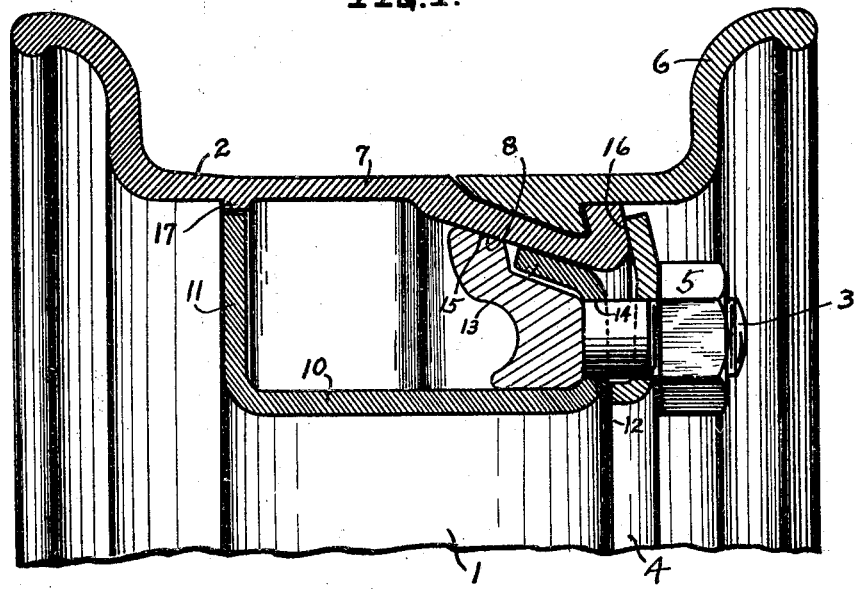
Figure 2:
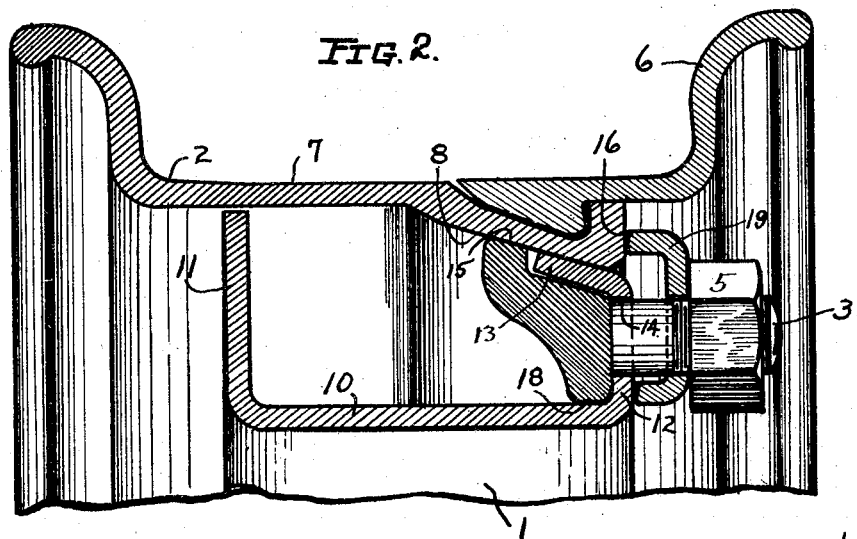

These and other objects will be apparent to those skilled in the art from a consideration of the following description of the invention as illustrated in the accompanying drawings wherein:

Figure 1 is a fragmentary transverse sectional view of a vehicle wheel felloe and rim construction embodying the invention; and Fig. 2 is a corresponding transverse sectional view of a modified form of felloe embodying the invention.

The vehicle wheel structure shown in Fig. 1 comprises a channel shaped felloe 1 on which a tire carrying rim 2 of conventional form is adapted to be secured by means of a plurality of circumferentially spaced clamping bolts 3, a clamping ring 4 and suitable clamping nuts 5.

The tire carrying rim 2 preferably embodies an endless locking member 6 that is interlocked with a transplit rim member 7 along their adjacent edges. A tapered seating face 8 is formed on the inner face of the rim member 7 underlying the interlocking portions of the two rim members. This provides a wedging and clamping face directly underlying the endless locking ring 6.

The felloe comprises a base portion 10 that has upstanding side flanges 11 and 12. The flange 12 has its edge portion 13 turned inwardly to provide a frusto-conical seating face for receiving a portion of the seating face 8 of the transplit rim member 7. The annular flange 12 also has a series of apertures 14 formed therein for receiving the shank portions of the clamping bolts. The clamping bolts may either have a loose or a tight fit within the corresponding apertures 14 of the felloe. The bolts 3 are preferably spaced equal distances around the circumference of the felloe.

Each of the clamping bolts 3 has a wedge shaped rim supporting head. One side of the bolt head preferably seats on the base portion 10 of the channel shaped felloe. The other side of the bolt head has an inclined rim seating face 15. A portion of the rim seating side of the bolt head may be cut away to permit the body of the bolt head to partially underlie the overhanging rim seating portion 13 of the felloe to assist in preventing turning of the bolt head and to provide an associated slightly yielding rim seating face of frusto-conical form.

The portion of the bolt head underlying the overhanging rim seating flange of the felloe is preferably spaced therefrom in order that the rim seating flange of the felloe will be slightly yieldable to thereby provide a continuous slightly yielding seating face on the felloe that is adjacent the rigid and relatively non-yieldable clamping faces of the tapered bolt heads.

The clamping ring 4 that is preferably used in association with the spaced clamping bolts 3 of the structure is preferably endless and contacts only with the lateral clamping face 16 of the rim and with the clamping nuts 5 of the bolts. This provides suitable means for forcing the rim assembly laterally of the felloe and for also drawing the wedge shaped bolt heads to rigid clamping position between the rim and the base of the felloe. The combination of the slightly yielding seating portion 13 and the relatively rigid seating portions of the bolt heads insures a rim mounting that will not loosen materially from vibration to which the structure is usually subjected.

The upstanding flange 11 of the felloe is of slightly less diameter than the internal diameter of the overhanging land 17 of the transplit rim member. This gives all of the advantages of laterally spaced seating faces for the rim assembly without the disadvantage of applying radially expansive wedging pressure to the portion of the transplit rim member remote from the endless locking ring. Also the upstanding flange is made of slightly less diameter than the overhanging face of the transplit rim member in order to facilitate assembly and disassembly of the rim and wheel structure. This also avoids the difficulties experienced in obtaining uniform seating of both clamping faces of a rim on a felloe structure embodying laterally spaced tapered clamping faces.

The embodiment of the invention illustrated by Fig. 2 is very similar to the structure shown in Fig. 1 and the corresponding elements of the two structures are similarly numbered. The rim member 7 of the structure is not provided with a raised land for engaging the deflection limiting shoulder 11 of the felloe. The head of the bolt 3 has a reduced area of contacting face 18 for engagement with the base 10 of the felloe. In Fig. 2 a separate clamping unit 19 is used with each wedging bolt 3 in lieu of the clamping ring 4.

The operation of the felloe constructions with the wedge bolt tightly fitted within the apertures of the side flange of the felloe is somewhat different from the operation of the felloe with the wedge bolt freely slidable within the felloe support. In a felloe construction in which the wedge bolt is slidable relative to the side flange, the rim structure is forced laterally over the yielding supporting face of the inclined flange 13 and the relatively non-yielding wedging face of the bolt head is drawn to rigid clamping relation between the rim and the felloe. It is desirable in all cases that the inclined seating face of the inwardly turned flange 13, if such is used, be arranged to permit secure seating of the rim structure on the inclined supporting face of the bolt head. The endless clamping ring that contacts with the lateral face 16 of the rim structure and that provides a slightly yielding relation between the clamping nut 5 and the rim structure forces the rim securely upon its seat and yieldingly holds it in this position in such manner that the rim does not readily become loose on the felloe in the service to which structures of this character are usually subjected.

The outstanding deflection limiting face of the flange 11 prevents distortion of the transversely split rim member from blows received by the tire or rim along the unsupported edge portion of the transversely split member. Because the member is discontinuous, distortion over the unsupported part of the rim more easily deforms the rim section than if the band were endless and if the rim section is badly deformed it is difficult to assemble and disassemble the rim as well as difficult to mount and dismount the assembled rim structure on the felloe.

Particular attention is invited to the provision in the proposed form of felloe of a rigid rim supporting seat that substantially underlies the interlocking portions of the endless and transplit rim member and that also provides an outstanding deflection limiting shoulder for preventing undesirable distortion of the transplit rim member without subjecting the transplit rim member to a radially outward wedging action remote from the endless interlocking ring which would tend to deform the transplit member. The slight clearance that is allowed between the outstanding supporting shoulder of the felloe and the overhanging portion of the rim member facilitates mounting and dismounting the rim structure.

The advantages incident to rim structures of the above described character will be apparent. The clamping bolts are inexpensive and can be used with or without the adjacent slightly yielding clamping face of the felloe. The proposed rim clamping mechanism may also be used with or without the spaced deflection limiting shoulder of the felloe, although the use of these different elements of the structure in various combinations give rise to new and beneficial results. Although only two structures embodying the invention are herein illustrated, it will be apparent to those skilled in the art that many modifications can be made therein without departing from the spirit and scope of the invention as set forth in the accompanying claims.

What I claim is:

1. A wheel assembly including a felloe, a rim formed with a seating surface, and a plurality of bolts carried by the felloe, each of the bolts being formed with a seating surface for engagement with the seating surface on the rim and said bolts constituting the sole rigid support for the rim.

2. A wheel assembly including a felloe, a rim formed with a tapered seating surface, and a plurality of bolts carried by the felloe, each of the bolts being formed with a tapered seating surface for engagement with the seating surface on the rim and said bolts constituting the sole rigid support for the rim.

3. A wheel assembly including a felloe, a rim formed with a tapered seating surface, a plurality of bolts carried by the felloe, each of the bolts being formed with a tapered seating surface for engagement with the seating surface on the rim and said bolts constituting the sole rigid support for the rim, clamping means carried by the bolts and means on the bolts for positioning the clamping means.

4. A wheel assembly including a felloe, a rim formed with a tapered seating surface, a plurality of bolts carried by the felloe, each of the bolts being formed with a tapered seating surface for engagement with the seating surface on the rim and said bolts constituting the sole rigid support for the rim, yielding clamping means carried by the bolts and engaging the felloe and the rim and means on the bolts for positioning the clamping means.

5. A wheel assembly including a felloe, a rim formed with a seating surface, and a plurality of bolts carried by the felloe, each of the bolts being formed with a seating surface for engagement with the seating surface on the rim and said bolts constituting the sole rigid support for the rim, the felloe being formed to provide a yielding supporting surface adjacent the seating surfaces on the bolts.

6. A wheel assembly including a felloe, a rim formed with a seating surface, and a plurality of bolts carried by the felloe, each of the bolts being formed with a seating surface for engagement with the seating surface on the rim and said bolts constituting the sole rigid support for the rim, the felloe being formed to provide a yielding supporting surface adjacent the seating surfaces on the bolts and an annular deflection limiting surface remote from the bolts and normally spaced from the rim.

7. A wheel assembly including a felloe composed of a base band and a plurality of radially outwardly extending flanges one of which is bent toward the other to provide a tapered seating surface, a plurality of bolts traversing one of the flanges, each bolt having a head disposed between the flanges and formed with a seating surface extending in alignment with the seating surface on the bent flange.

8. A wheel assembly including a felloe composed of a base band and a plurality of radially outwardly extending flanges one of which is bent toward the other to provide a tapered seating surface, a plurality of bolts traversing one of the flanges, each bolt having a head disposed between the flanges and formed with a seating surface extending in alignment with the seating surface on the bent flange and with a surface paralleling the seating surface on the flange and spaced slightly from the bent flange.

9. A vehicle wheel assembly comprising an annular base portion, a radially outwardly disposed flange on one edge thereof and an inwardly extending flange on the other edge thereof providing a tapered rim seating face, a plurality of wedging bolts carried by the felloe and traversing one of the flanges, each of said bolts having an enlarged head disposed between the flanges and formed with a wedging face lying substantially in the plane of the seating surface.

10. A vehicle wheel assembly comprising an annular base, a radially outwardly disposed flange formed on one edge thereof of slightly less diameter than the inner diameter of a rim adapted to be mounted thereon, a bent flange formed on the other edge of the base and providing a tapered seating surface, a plurality of wedging bolts each having a shank portion extending through the bent flange and each having a wedge shaped head disposed between the flanges and formed with a rim seating face in alignment with the tapered seating surface, and a face substantially parallel to and radially spaced from the tapered seating surface.

11. A vehicle wheel assembly comprising a tire receiving rim formed with an inclined seating face, a felloe having a seating face for engagement with the seating face on the rim, and, a radially outwardly extending flange spaced slightly from the rim, and a plurality of bolts carried by the felloe, each bolt having a seating face disposed in alignment with the seating face of the felloe and a second face parallel to but spaced from the seating face of the felloe.

12. A wheel assembly including a channel shaped felloe and a plurality of bolts carried by the felloe, each bolt having an enlarged head, formed with a tapered rim seating surface disposed within the channel of the felloe.

13. A wheel assembly including a channel shaped felloe composed of an annular base and a pair of radially outwardly extending flanges, one of which is formed with spaced apertures, and a plurality of bolts traversing the apertured flange and having enlarged heads formed with tapered rim seating surfaces disposed between the flanges of the felloe.

In testimony whereof I affix my signature.
FRANK H. MEYER.